United States Patent [19]

Konishi

[11] Patent Number: 4,967,560
[45] Date of Patent: Nov. 6, 1990

[54] PARKING SUSTAINER EMPLOYING LIQUID PRESSURE BOOSTER

[75] Inventor: Masaru Konishi, Saitama, Japan

[73] Assignee: Jidosha Kiki Co., Ltd., Tokyo, Japan

[21] Appl. No.: 419,644

[22] Filed: Oct. 11, 1989

[30] Foreign Application Priority Data

Oct. 28, 1988 [JP] Japan .................. 63-272532

[51] Int. Cl.⁵ .............................. F15B 7/00
[52] U.S. Cl. ........................ 60/645; 60/541;
                                    91/376 R; 91/374
[58] Field of Search .......... 60/541, 545; 91/368,
           91/376 R, 374, 459; 180/282; 188/190; 303/100

[56] References Cited

U.S. PATENT DOCUMENTS 4,667,471  5/1987  Fulmer et al. .................. 60/545
4,681,196  7/1987  Fulmer et al. .............. 60/545 XR
4,759,255  7/1988  Shimamura .

FOREIGN PATENT DOCUMENTS 57-130845  8/1982  Japan .
62-279164  12/1987  Japan .

Primary Examiner—Allen M. Ostrager
Attorney, Agent, or Firm—Flynn, Thiel, Boutell & Tanis

[57] ABSTRACT

A parking sustainer which allows a vehicle to be maintained parked by continuing a braking action if the depression of a brake pedal is terminated. An open/close valve is disposed in a liquid pressure discharge passage usually provided in a liquid pressure booster, and control means closes the open/close valve when a set of conditions to maintain the vehicle parked are satisfied. The provision of the open/close valve in the discharge passage of the booster eases the space requirement for its mounting and facilitates a maintenance inspection or repair.

3 Claims, 1 Drawing Sheet

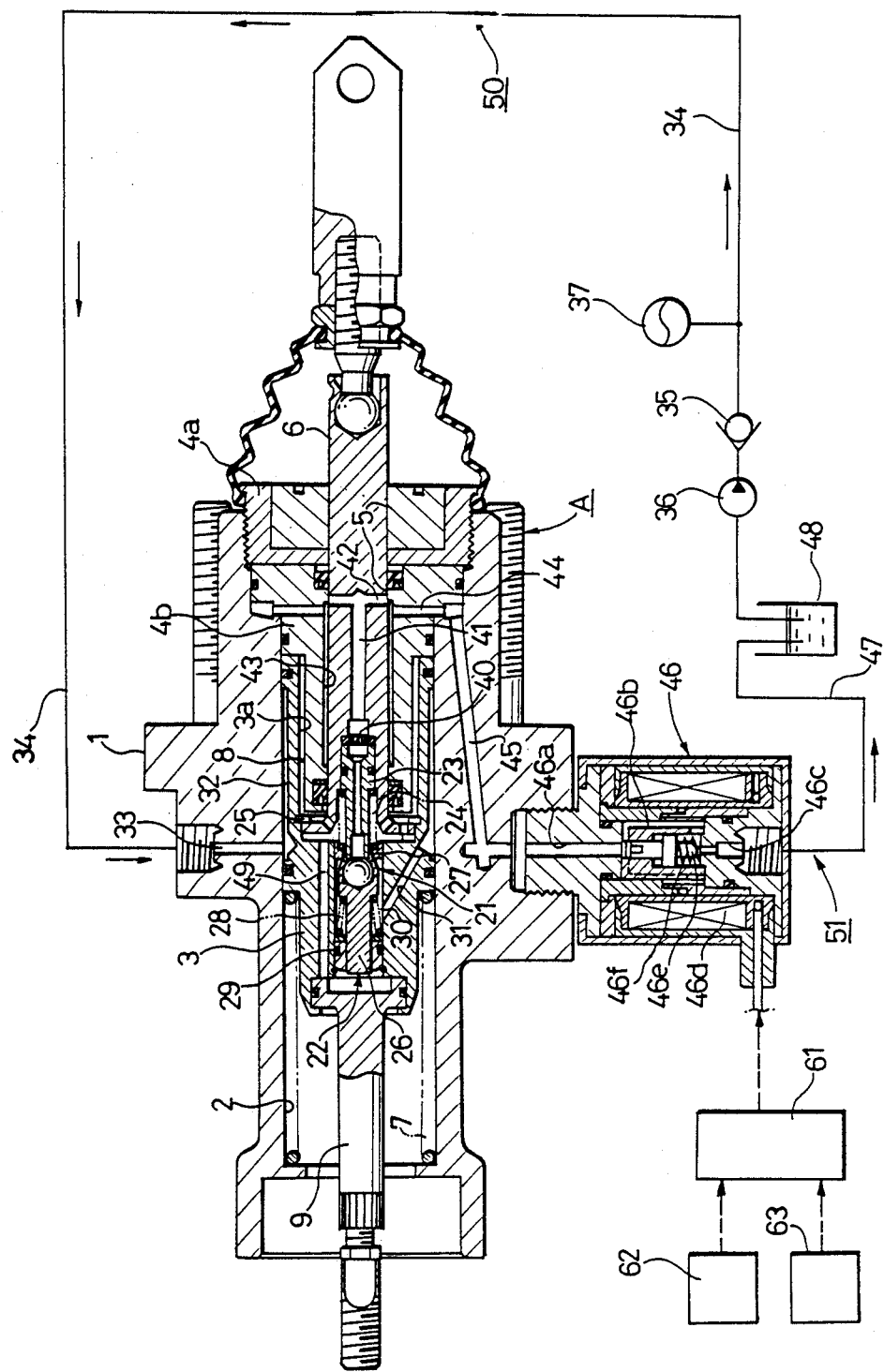

PARKING SUSTAINER EMPLOYING LIQUID PRESSURE BOOSTER

FIELD OF THE INVENTION

The invention relates to a parking sustainer which maintains a vehicle parked by automatically actuating a brake whenever a given set of parking conditions applies, and more particularly, to a parking sustainer employing a liquid pressure booster.

DESCRIPTION OF THE PRIOR ART

Parking sustainers are known in the art in which an actuator is connected to an input shaft which is mechanically coupled with a brake pedal so that the braking action may be developed by operating the actuator or in which a solenoid valve is disposed in a valve body of a negative pressure brake booster for opening or closing a vacuum passage so that when a vehicle is braked, the vacuum passage is closed to thereby prevent the atmosphere which is once introduced into a variable pressure chamber from finding its way out through the vacuum passage if a brake pedal is released, thus maintaining a vehicle in its parked condition (see Japanese Laid-Open Patent Applications No. 130,845/1982 and No. 279,164/1987).

In the former arrangement, mounting the actuator onto the vehicle and the adjustment of the mechanical coupling of the actuator represent troublesome operations, and difficulty is also experienced in securing a space in which to mount the actuator.

On the other hand, in the latter arrangement, since the solenoid valve is contained within the brake booster, the brake booster must be disassembled when it becomes necessary to conduct a maintenance inspection of the valve or when trouble-shooting the valve.

SUMMARY OF THE INVENTION

In view of the foregoing, the invention utilizes a liquid pressure booster comprising a power piston which is slidably disposed in a housing, a power chamber formed in one end of the power piston, and a control valve operated in association with an input shaft for introducing a liquid pressure into the power chamber in accordance with the magnitude of an input force applied to the input shaft, thereby driving the power piston forward. In accordance with the invention, the booster also comprises an open/close valve operating to discharge a pressure fluid which has been introduced into the power chamber into a reservoir, and control means for closing the open/close valve whenever a given set of parking conditions of the vehicle are satisfied.

With this arrangement, if the open/close valve is closed when a liquid pressure which depends on an input force applied to the input shaft has been introduced into the power chamber, any attempt to discharge the introduced pressure fluid into a reservoir upon release of the input will fail since the discharge passage is closed by the open/close valve, thus allowing the vehicle to be maintained as parked.

It will be appreciated that the open/close valve may be suitably located on the discharge passage which provides a communication between the power chamber and the reservoir, and hence can be mounted at any available position on the outside of the housing, thus easing the space requirement for its mounting and also facilitating its maintenance inspection or repair.

Above and other objects, features and advantages of the invention will become apparent from the following description of an embodiment thereof with reference to the drawing.

BRIEF DESCRIPTION OF THE DRAWING

The single drawing is a diagrammatic view of one embodiment of the invention, illustrating a main part in cross section.

DETAILED DESCRIPTION OF EMBODIMENT

Referring to the drawing, an embodiment of the invention will now be described. A liquid pressure booster A includes a substantially cylindrical housing 1, having an axially extending bore 2 in which a power piston 3 is disposed in a slidable manner. A plug 4a is threadably engaged with the housing at the right end of the bore 2, and a stepped stop member 4b is disposed to the left of the plug 4a and is secured to the housing 1 by means of the plug 4a. Openings 5 extend through both the plug 4a and the stepped member 4b in axial alignment with the bore 2, and an input shaft 6 which is mechanically coupled to a brake pedal, not shown, slidably extend therethrough.

The power piston 3 is normally urged by a spring 7, which is received inside the bore 2, into abutment against the step of the stop member 4b which represents its inoperative position. Under this condition, the left end of the stop member 4b having a reduced diameter is received into a stepped opening 3a formed in the right end of the power piston 3, or more specifically, in a portion thereof having an increased diameter, thus defining a power chamber 8 between the internal surface of the stepped opening 3a and the external surface of the stop member 4b. A push rod 6 is connected to the left end of the power piston 3 and is mechanically coupled to a piston of a master cylinder, not shown.

The front end of the input shaft 6 slidably extends through the opening 5 formed in the stop member 4b to project into the stepped opening 3a formed in the power piston 3 with a control valve 21 being defined within the front end of the input shaft 6 and the small diameter portion of the stepped opening 3a in the power piston 3 for introducing a liquid pressure which depends on the magnitude of an input applied to the input shaft 6 into the power chamber 8.

Specifically, the control valve 21 comprises a check valve 22 disposed within the stepped opening 3a, and an annular pin 23 mounted on the input shaft 6 which operates to force the check valve 22 open. A spring 24 disposed between the power piston 3 and the input shaft 6 normally urges the input shaft 6 into abutment against a stop ring 25 which is mounted on the power piston 3, thus allowing the check valve 22 to be maintained closed. The check valve 22 includes a valve element 26, which is adapted to be seated upon a valve seat 27 formed on the power piston 3 from the left under the resilience of a spring 28. A pressure chamber 30, which is defined by a seal formed by the engagement between the valve element 26 and the valve seat 27 and also by a seal member 29 sealing the valve element 26, communicates with a pump 36 through a passage 31 extending through the piston 3, an annular groove 32 formed in the outer peripheral surface of the piston 3, a passage 33 extending through the housing 1, a conduit 34 connected to the passage 33 and a check valve 35 disposed in the conduit 34, thus normally feeding a pressure fluid into the pressure chamber 30. An accumulator 37 is disposed along the conduit 34 at a location downstream of the check valve 35.

On the other hand, the annular pin 23 has a hollow shank which communicates through an orifice 40, an axial passage 41 and a radial passage 42, both formed to extend through the input shaft 6, with an annular groove 43 which is formed in the stop member 4b, and thence communicates through a passage 44 formed in the stop member 4b, a passage 45 formed in the housing 1, passages 46a, 46b and 46c formed in a solenoid valve 46 which is connected to the opening of the passage 45 and a conduit 47 connected to the passage 46c of the valve 46 with a reservoir 48 of the pump 36.

It will be noted that the space surrounding the annular pin 23 communicates with the power chamber 8, which communicates through an axial passage 49 formed in the power piston 3 to the left side of the seal member 29 associated with the valve element 26 of the check valve 22. A path which communicates the power chamber 8 with the pump 36 through the check valve 22 of the control valve 21 is defined as a pressure fluid supply passage 50 while a path which communicates the power chamber 8 with the reservoir 48 through the inside of the annular pin 23 of the control valve 21 is defined as a discharge passage 51.

Control means 61, which may comprise a microcomputer, controls the opening or closing of the solenoid valve 46, and is fed with signals from a vehicle speed detector 62 which detects a vehicle speed and from an accelerator detector 63 which detects the depression of an accelerator pedal. The control means controls the energization of a solenoid 46d of the solenoid valve 46, determining if a given set of conditions are satisfied to maintain the vehicle parked on the basis of these signals.

When the solenoid 46d is energized by the control means, a valve element 46e of the solenoid valve 46 is driven down against the resilience of a spring 46f, whereupon the passage 46c is closed as is the discharge passage 51. By contrast, when the solenoid 46d is deenergized, the spring 46f returns the valve element 46e to its original position, thus opening the passage 46c and hence the discharge passage 51.

In the described arrangement, in a normal inoperative condition where the solenoid valve 46 is open, the valve element 26 is seated upon the valve seat 27 to close the supply passage 50 while the annular pin 23 is spaced from the valve element 26 to open the discharge passage 51, and hence the liquid pressure within the power chamber 8 is substantially maintained null.

If the brake pedal is now depressed to drive the input shaft 6 to the left, the front end of the annular pin 23 abuts against the valve element 26 of the check valve 22 to form a seal, whereupon the discharge passage 51 is interrupted. As the input shaft 6 continues to be driven to the left, the annular pin 23 moves the valve element 26 away from the valve seat 27 to thereby open the supply passage 50, thus allowing the liquid pressure which has been introduced into and maintained within the pressure chamber 3 to be introduced into the power chamber 8 through a space surrounding the annular pin 23. The liquid pressure is also supplied to the left side of the valve element 26 through the axial passage 49 formed in the power piston 3, whereby the valve element 26 is prevented from being driven to the left by the liquid pressure which is introduced into the power chamber 8.

When the liquid pressure is introduced into the power chamber 8, it causes the power piston 3 to be driven to the left against the resilience of the spring 7, thus producing a braking action while simultaneously acting upon the input shaft to allow a driver of the vehicle to sense a braking reaction. Under an intermediate load condition, the liquid pressure introduced into the power chamber 8 is controlled to a pressure which depends on the magnitude of an input force applied to the input shaft 6 or the depression of the brake pedal in the similar manner as in a conventional liquid pressure brake booster.

When the braking action mentioned above brings a vehicle to a stop, a signal from the vehicle speed detector 62 informs the control means 61 to this effect. While feeding a signal from the accelerator detector 63, when the control means 61 detects that the vehicle has been maintained at rest for a given time interval continuously without any depression of the accelerator pedal, it determines that a set of conditions to maintain the vehicle parked is satisfied, thus closing the solenoid valve 46.

Accordingly, under this condition, the liquid pressure which has been introduced into the power chamber 8 is prevented from being discharged to the reservoir 48. If the brake pedal is released to cause the valve element 26 to be seated upon the valve seat 27 to thereby close the supply passage 50 and also causes the annular pin 23 to move away from the valve element 26 to open a portion of the discharge passage 51 located in this region, the pressure fluid within the power chamber 8 cannot be discharged into the reservoir 48, inasmuch as the discharge passage 51 remains closed by the solenoid valve 46. In other words, the braking action continues to be effective if the depression of the brake pedal is terminated.

If the accelerator pedal is then depressed, the control means 61 detects this in response to a signal from the accelerator detector 63. Thus, it determines that the set of conditions to maintain the vehicle parked are no longer satisfied, and operates to open the solenoid valve 46. Thus, the liquid pressure which has been confined in the power chamber 8 is discharged to the reservoir 48 through the discharge passage 51, reducing the pressure within the power chamber 8 and allowing it to return to the inoperative condition shown in the drawing.

In the embodiment described above, the set of conditions which are effective to maintain the vehicle parked comprises the detection of a vehicle speed and the depression of an accelerator pedal, but it should be understood that such a set of conditions are not limited thereto, but may comprise additional appropriate conditions such as a slanted condition of the vehicle or a shift position, or alternatively the depression of an accelerator pedal may be replaced by a clutch connection on a vehicle utilizing a transmission.

While the invention has been described above in connection with an embodiment thereof, it should be understood that a number of changes, modifications and substitutions will readily occur to one skilled in the art from the above disclosure without departing from the spirit and scope of the invention defined by the appended claims.

What is claimed is:

1. A parking sustainer employing a liquid pressure booster including a power piston which is slidably disposed in a housing, a power chamber defined in one end of the power piston, and a control valve operated in response to an input shaft for introducing a liquid pressure into the power chamber which depends on the magnitude of an input force applied to the input shaft to thereby drive the power piston forward; the parking sustainer comprising an open/close valve disposed in a discharge passage which allows the pressure fluid introduced into the power chamber to be discharged into a reservoir, and control means for closing the open/close valve when a set of conditions to maintain a vehicle parked are satisfied.

2. A parking sustainer according to claim 1 in which the open/close valve comprises a solenoid valve which is mounted in an opening of the discharge passage which is formed in the housing.

3. A parking sustainer according to claim 1 in which the control means determines whether the set of conditions to maintain the vehicle parked are satisfied on the basis of signals from a vehicle speed detector which detects a vehicle speed and an accelerator detector which detects the depression or not of an accelerator pedal.

* * * * *